(12) United States Patent
Comte et al.

(10) Patent No.: US 6,284,687 B1
(45) Date of Patent: Sep. 4, 2001

(54) HIGH REFRACTIVE INDEX GLASSES, MULTIFOCAL CORRECTIVE LENSES CONTAINING SAME

(75) Inventors: Marie M. J. Comte, Fontenay aux Roses; Paulo Marques, Sainte Genevieve des Bois, both of (FR)

(73) Assignee: Corning S.A., Avon Cedex (FR)

( * ) Notice: Subject to any disclaimer, the term of this patent is extended or adjusted under 35 U.S.C. 154(b) by 0 days.

(21) Appl. No.: 09/529,306

(22) PCT Filed: Sep. 29, 1998

(86) PCT No.: PCT/US98/20350

§ 371 Date: Apr. 7, 2000

§ 102(e) Date: Apr. 7, 2000

(87) PCT Pub. No.: WO99/19266

PCT Pub. Date: Apr. 22, 1999

Related U.S. Application Data

(60) Provisional application No. 60/066,168, filed on Nov. 19, 1997.

(30) Foreign Application Priority Data

Oct. 10, 1997 (FR) .................................................. 97 12664

(51) Int. Cl.$^7$ ............................. C03C 3/066; C03C 3/068; C03C 3/072; C03C 3/074

(52) U.S. Cl. .................. 501/75; 501/76; 501/78; 501/79; 501/900; 501/903; 501/428; 501/426; 501/359; 501/652

(58) Field of Search ................................. 501/75, 76, 78, 501/79, 900, 903; 428/426; 359/652

(56) References Cited

U.S. PATENT DOCUMENTS

| | | |
|---|---|---|
| 4,568,651 | 2/1986 | Sagara . |
| 5,162,826 | 11/1992 | Morgan et al. . |
| 5,204,292 | 4/1993 | Michimata . |
| 5,744,409 | 4/1998 | Hashimoto et al. . |

*Primary Examiner*—Karl Group
(74) *Attorney, Agent, or Firm*—Milton M. Peterson

(57) ABSTRACT

The present invention relates to glasses of high refractive index having the following composition of oxides, expressed in percentages by weight: $SiO_2$ 29–35, $B_2O_3$ 0.5–5, $Li_2O$ 0.5–3, $Na_2O$ 4–8, $K_2O$ 0–2, PbO 28–40, BaO 4–14, $La_2O_3$ 4–12, $TiO_2$ 3–8, ZnO 0–8, $ZrO_2$ 0–4, $Nb_2O_5$ 0–5, with: $Li_2O+Na_2O+K_2O$ 5.5–9; their use for the production of segments for multifocal corrective lenses; and multifocal corrective lenses incorporating at least one such segment in their structure.

9 Claims, No Drawings

HIGH REFRACTIVE INDEX GLASSES, MULTIFOCAL CORRECTIVE LENSES CONTAINING SAME

This application claims benefit of provisional application Ser. No. 60/066,168 filed Nov. 19, 1997.

FIELD OF THE INVENTION

The present invention relates to high refractive index inorganic glasses; said index being more specifically between 1.70 and 1.78. Said glasses have particularly interesting uses as optical or ophthalmic glasses and are most particularly appropriate for manufacturing segments which enter into the making of multifocal corrective lenses. Said multifocal corrective lenses which incorporate at least one segment in a glass of the invention make up an integral part of the present invention.

BACKGROUND OF THE INVENTION

A multifocal lens is constituted of a principal lens in glass and of one or more segments in glass which are fused onto it. These segments have a higher refractive index than that of the principal lens; this enables obtaining areas of higher corrective power. Said segment(s) is (are) normally soldered onto the principal lens during a heat treatment bringing the whole of the glasses to a temperature close to the softening point of the glass constituting the principal lens. Consequently, the segment glasses must have characteristics of viscosity close to those of the glass of the principal lens. It must also have close thermal expansion characteristics, so that the resulting soldering has a very low strain level.

The objective of the present invention was to obtain glasses of refractive index between 1.70 and 1.78, fusible particularly to an ophthalmic glass manufactured by the Applicant Company (Corning S.A.). of index 1.6. of Abbe number 41 and which has the following physical characteristics:

thermal expansion coefficient: $100 \times 10^{-7} K^{-1}$ (between 25 and 300° C.), softening point: 610° C.

strain point: 460° C., annealing point: 490° C.

Said glass of the Applicant Company bears the Codename 8008. It was described in U.S. Pat. No. 4,540,672.

It has been determined experimentally that, in order to be fusible to said glass Code-named 8008, the glasses of the invention must have a thermal expansion coefficient between about 90 and $110 \times 10^{-7} K^{-1}$ and a softening point between about 570 and 620° C.

Furthermore, it was desired that said glasses of the invention have:

a low tendency to devitrify and a high liquidus viscosity ($\geq 10$ Pa.s); which facilitates their forming and limits their costs of production; and as much as possible, a good chemical durability.

The technical problem to be solved within the context of the present invention has therefore been that of providing glasses having the specifications below:

high refractive index: $1.70 \leq n \leq 1.78$;

thermal expansion coefficient: between about 90 and $110 \times 10^{-7} K^{-1}$ (between 25 and 300° C.);

softening point: between about 570 and 620° C.

low tendency to devitrify and high liquidus viscosity ($\geq 10$ Pa.s).

Within the context of an advantageous variant of the invention, it was sought that said glasses, having the specifications above, have furthermore a good chemical durability.

PRIOR ART

According to the prior art, numerous glasses having a refractive index higher than 1.7 and which are able to be used as segment glass are already known. On the other hand, to the knowledge of the Applicant, there exists few, even none of them which have the specifications indicated above.

In the Application FR 97 05357 of Apr. 30, 1997, the Applicant has itself described glasses which have the refractive index, the thermal expansion coefficient and the softening point sought after here. Said glasses have the composition by weight below:

| | |
|---|---|
| $SiO_2$ | 27–36 |
| $B_2O_3$ | 0–9 |
| $Li_2O$ | 1–5 |
| $Na_2O$ | 1–7 |
| $K_2O$ | 0–7 |
| CaO | 0–7 |
| BaO | 4–13 |
| ZnO | 0–8 |
| $La_2O_3$ | 4–15 |
| PbO | 4–27 |
| $TiO_2$ | 7–18 |
| $ZrO_2$ | 0–9 |
| $Nb_2O_5$ | 0–8 |
| with: $Li_2O + Na_2O + K_2O$ | 6–15 |
| $SiO_2 + TiO_2 + ZrO_2$ | 42–55 |
| $PbO + TiO_2 + ZrO_2 + Nb_2O_5$ | 29–40. |

They do not however have optimized devitrification characteristics. In fact, amongst said glasses, the most efficient from this point of view only have a liquidus viscosity of greater than 3 Pa.s which can attain (for the preferred compounds) a maximum of 7 Pa.s.

As indicated above, the Applicant has sought to obtain glasses having a liquidus viscosity of at least 10 Pa.s; the forming, of such classes being largely facilitated.

The Applicant has, in an entirely surprising way, obtained glasses having the specifications above (thus having notably a liquidus viscosity equal to or greater than 10 Pa.s) by modifying a little the composition of those described in the Application FR-A-2 508 433. The glasses described in said Application have the composition by weight below:

| | |
|---|---|
| $SiO_2$ | 28–<33 |
| $Li_2O$ | 0–1 |
| $Na_2O$ | 2–9 |
| $K_2O$ | 0–4 |
| PbO | >28–34 |
| BaO | 0–<22 |
| $La_2O_3$ | 0–20 |
| $TiO_2$ | 0–9 |
| ZnO | 0–4 |
| $ZrO_2$ | 2–6.5 |
| $Nb_2O_5$ | 0–10 |
| with: $Li_2O + Na_2O + K_2O$ | 4–10.5 |
| $BaO + La_2O_3$ | 14–<22 |
| $TiO_2 + Nb_2O_5$ | >4–12 |
| $TiO_2 + Nb_2O_5 + ZrO_2$ | 6–17 |

They could not, a priori, lead obviously to the invention insofar as they have a softening point notably higher than that sought after: 640–700° C. instead of 570–620° C. (see the specifications above).

Furthermore, it is hereby stressed on the fact that there does not exist, to the knowledge of the person skilled in the art, any general rules for increasing assuredly the liquidus viscosity of an inorganic glass.

SUMMARY OF THE INVENTION

The glasses of the invention have the properties required for the specifications as given above. In other words, in order to have the specifications, the Applicant proposes a solution (glass compositions) which is entirely original.

The Applicant proposes novel glasses having the following composition of oxides, expressed in percentages by weight:

| | |
|---|---|
| $SiO_2$ | 29–35 |
| $B_2O_3$ | 0.5–5 |
| $Li_2O$ | 0.5–3 |
| $Na_2O$ | 4–8 |
| $K_2O$ | 0–2 |
| PbO | 28–40 |
| BaO | 4–14 |
| $La_2O_3$ | 4–12 |
| $TiO_2$ | 3–8 |
| ZnO | 0–8 |
| $ZrO_2$ | 0–4 |
| $Nb_2O_5$ | 0–5 |
| with: $Li_2O + Na_2O + K_2O$ | 5.5–9. |

DESCRIPTION OF THE INVENTION

The glasses of the invention are obtained essentially from the oxides identified above, taken in the amount specified above. It is certainly not excluded that other oxides intervene (vide infra) but, in any case, said other oxides do not intervene in significant amounts (always ≦5%, generally ≦3% by weight, even ≦1% by weight) and do not have a significant influence upon the properties sought after. They only intervene for adjustments.

The principal constituents of the glasses of the invention are $SiO_2$ and PbO. Said glasses also contain $B_2O_3$, $Li_2O$, $Na_2O$, BaO, $La_2O_3$ and $TiO_2$. As regards the optional components ($K_2O$, ZnO, ZrO, and $Nb_2O_5$), it is specified here, to all useful ends, that the minimal intervening amount from which they exert a significant effect is generally in the order of 0.5%. Thus, the glasses of the invention can contain none of these optical constituents or, if they do contain them, it is generally in a minimal amount of 0.5% (% by weight).

According to an advantageous variant of the first object of the invention, the glasses having the following composition of oxides expressed in percentages by weight:

| | |
|---|---|
| $SiO_2$ | 30–35 |
| $B_2O_3$ | 0.5–3 |
| $Li_2O$ | 0.5–3 |
| $Na_2O$ | 4–8 |
| $K_2O$ | 0–2 |
| PbO | 34.5–40 |
| BaO | 4–12 |
| $La_2O_3$ | 4–10 |
| $TiO_2$ | 4.5–8 |
| ZnO | 0–5 |
| $ZrO_2$ | 0–1.5 |

(with, obviously, as indicated above: $Li_2O+Na_2O+K_2O$ 5.5–9).

These preferred glasses of the invention have a very good chemical durability, which is very interesting for glasses of optical quality.

Within the context of the present inventions, those glasses are more particularly preferred which have the following composition of oxides expressed in percentages by weight:

| | |
|---|---|
| $SiO_2$ | 31–35 |
| $B_2O_3$ | 0.5–2.5 |
| $Li_2O$ | 0.5–2 |
| $Na_2O$ | 4–6.5 |
| PbO | 36–40 |
| BaO | 4–<10 |
| $La_2O_3$ | 4–7 |
| $TiO_2$ | 4.5–7.5 |
| ZnO | 0–4 |
| $ZrO_2$ | 0–1 |

(with, obviously, as indicated above: $Li_2O+Na_2O+K_2O$ 5.5–9)

The physical characteristics of one of these particularly preferred glasses (subject of Example 1, below) has been given further on in the text (in said Example 1, see Table 1).

The high refractive index (1.70≦n≦1.78) of the glasses of the invention is mainly obtained by virtue of the high PbO content. That is why the minimal content of this element must be 28%. The maximal content is limited to 40% since beyond this, the glass has a high density and a high dispersion.

The alkali metal oxides ($Li_2O$, $Na_2O$ and optionally $K_2O$) in the proportions indicated above enable obtaining the expansion and the characteristics of viscosity sought after. $Li_2O$, in particular, decreases the softening point very strongly.

It has been observed in a surprising way that the presence of $B_2O_3$ was indispensable for obtaining the devitrification characteristics sought after: this element reduces the devitrification temperature. This is why at least 0.5% of it is introduced. Furthermore, this element has the advantage of decreasing the viscosity whilst having little influence upon the dilation. However, at more than 5% intervention of said element, the softening point is too low.

BaO, $La_2O_3$ and ZnO enable adjusting the index and the viscosity of the glass. Their contents are limited to 14, 12 and 8% respectively since above this, these elements have a negative effect upon the devitrification.

It has been observed that the chemical durability of the glasses of the invention depends upon their $SiO_2$ and $TiO_2$ contents. This is why, in the preferred field, the contents of these elements are at least 30 and 4.5%. At more than 35% of $SiO_2$ it is difficult to keep the refractive index, the softening point and the expansion desired; while more than 8% of $TiO_2$, the devitrification is degraded.

$ZrO_2$ and $Nb_2O_5$ contribute advantageously to obtaining high index. However. too high $ZrO_2$ content causes a devitrification at low viscosity while the level of $Nb_2O_5$ is limited because this element is very expensive.

In order to adjust the properties, as indicated above, other oxides such as $Al_2O_3$, MgO, CaO and SrO can also be added. Their total content must not go over 5% (by weight).

It is also possible to add conventional finishing agents such as $As_2O_3$ or $Sb_2O_3$, fluorides, bromides or chlorides with the proviso that their total content does not exceed 1% (by weight).

If desired, bleaching agents can be added. It is also possible to color the glass by adding conventional coloring elements, e.g. transition metal oxides or rare earth oxides.

The manufacture of the glasses of the invention does not bring about any particular difficulty; it does not necessitate any unusual condition or measure. It is within the reach of the person skilled in the art.

The conventional starting materials, such as oxides, carbonates and nitrates, can be used for the preparation of the fillers to be melted. The usual precautions, as to the purity of said intervening starting materials, for obtaining optical glasses suffice (obviously if it is desired to obtain glasses of optical quality).

According to another of its objects, the present invention relates to the use of the glasses having the original compositions specified above for the production of segments, of high refractive index, of multifocal corrective lenses. In other words, another objective of the present invention is multifocal corrective lenses which comprise, in a manner known per se, a principal lens in a glass of relatively low refractive index and at least one segment soldered to said principal lens in a glass of higher refractive index; said segment(s) being characteristically in an original glass of the invention. Said multifocal corrective lenses of the invention generally comprise one sole segment of this type in their structure. The intervention of several of said segments is however in no way excluded.

As indicated in the introduction of the present text, the glasses of the invention have been most particularly developed to be fused with a glass (Code 8008) having the characteristics below:

thermal expansion coefficient: $100 \times 10^{-7} K^{-1}$ (between 25 and 300° C.);

softening point: 610° C.;

refractive index: 1.6.

Thus the invention, within the context of its second objective, relates more particularly to a multifocal corrective lenses whose principal lens is in said glass (having the characteristics above) and whose segment(s) is (are) in a glass of the invention.

The invention is illustrated in a totally non-limiting manner by Examples 1, 2, 3 and 4 below. The glass of Example 4 is a particularly preferred glass of the invention.

According to an operating method specified below, glasses of the invention have been prepared whose compositions are given in the Table 1 below. Said compositions are expressed in percentages by weight.

Operating Method

In each case, 2,500 g of starting materials were melted for one hour at 1,250° C. in a platinum crucible. The glass was then made into bars of one centimeter thickness.

The annealing was carried out with a cooling rate of 60° C./hour.

This operating method was carried out on the laboratory scale. It is well obvious that the glasses of the invention may be manufactured industrially by using conventional methods of melting and forming.

In said Table 1 below, the physical characteristics of the glasses obtained are specified. The measurements of these physical characteristics was carried out by conventional methods.

The expansion coefficients were measured between 25 and 300° C. They are expressed in multiples of $10^{-7} K^{-1}$.

The softening point or Littleton point is the temperature at which the viscosity of the glass is $10^{6.5}$ Pa.s. ($10^{7.5}$ poises).

The liquidus was determined by bringing the glass samples to the temperatures given for 17 hours. It is considered that the liquidus has been passed over when a microscopic observation does not show the presence of crystals after this treatment.

The durability was estimated by a test commonly used for ophthalmic applications, namely the A.O. test which consists of immersing a sample, whose every side have been polished, for 10 minutes in a 10% (by weight) solution of hydrochloric acid kept at 25° C., and by measuring the loss of weight. This loss of weight is then brought back to the surface unit.

It is hereby indicated, in a general manner, that the glasses of the preferred field of the invention (see pages 5 to 6) have a loss of weight lower than 0.2 mg/cm².

TABLE 1

| | EXAMPLES | | | |
|---|---|---|---|---|
| | 1 | 2 | 3 | 4 |
| SiO$_2$ | 33.8 | 33.8 | 30.8 | 33.5 |
| B$_2$O$_3$ | 1.5 | 1.5 | 1.3 | 1.5 |
| Li$_2$O | 1 | 1 | 1 | 1.0 |
| Na$_2$O | 5.2 | 5.2 | 5.7 | 5.2 |
| K$_2$O | — | — | 1 | — |
| PbO | 38.6 | 38.9 | 31.8 | 37.4 |
| BaO | 5.4 | 5.4 | 12.4 | 9.4 |
| ZnO | 2.7 | 1.7 | 2.7 | — |
| La$_2$O$_3$ | 5.7 | 5.7 | 5.7 | 5.7 |
| TiO$_2$ | 5.8 | 4.3 | 4.3 | 6.3 |
| ZrO$_2$ | 0.3 | 0.8 | 3.3 | — |
| Nb$_2$O$_5$ | — | 1.7 | — | — |
| Li$_2$O + Na$_2$O + K$_2$O | 6.2 | 6.2 | 7.7 | 6.2 |
| Refractive index | 1.739 | 1.735 | 1.735 | 1.7375 |
| Expansion coefficient | 93 | 91 | 100 | 95 |
| Softening point (° C.) | 575 | 578 | 583 | 586 |
| Devitrification | | | | |
| Liquidus (° C.) | 941–963 | — | 940–960 | <970 |
| Liquidus viscosity (Pa · s) | 18–14 | >18 | 18–14 | >13 |
| AO Test | | | | |
| Loss of weight (mg/cm²) | 0.02 | — | — | 0.025 |

We claim:

1. High refractive index glasses having the following composition of oxides, expressed in percentages by weight:

| | |
|---|---|
| SiO$_2$ | 29–35 |
| B$_2$O$_3$ | 0.5–5 |
| Li$_2$O | 0.5–3 |
| Na$_2$O | 4–8 |
| K$_2$O | 0–2 |
| PbO | 28–40 |
| BaO | 4–14 |
| La$_2$O$_3$ | 4–12 |
| TiO$_2$ | 3–8 |
| ZnO | 0–8 |
| ZrO$_2$ | 0–4 |
| Nb$_2$O$_5$ | 0–5 |
| with: Li$_2$O + Na$_2$O + K$_2$O | 5.5–9. |

2. The glasses according to claim 1 having the following composition of oxides, expressed in percentages by weight:

| | |
|---|---|
| SiO$_2$ | 30–35 |
| B$_2$O$_3$ | 0.5–3 |
| Li$_2$O | 0.5–3 |
| Na$_2$O | 4–8 |
| K$_2$O | 0–2 |
| PbO | 34.5–40 |
| BaO | 4–12 |
| La$_2$O$_3$ | 4–10 |
| TiO$_2$ | 4.5–8 |
| ZnO | 0–5 |

-continued

| | |
|---|---|
| $ZrO_2$ | 0–1.5 |
| with: $Li_2O + Na_2O + K_2O$ | 5.5–9. |

3. The glasses according to claim 1 having the following composition of oxides, expressed in percentages by weight:

| | |
|---|---|
| $SiO_2$ | 31–35 |
| $B_2O_3$ | 0.5–2.5 |
| $Li_2O$ | 0.5–2 |
| $Na_2O$ | 4–6.5 |
| PbO | 36–40 |
| BaO | 4–<10 |
| $La_2O_3$ | 4–7 |
| $TiO_2$ | 4.5–7.5 |
| ZnO | 1–4 |
| $ZrO_2$ | 0–1 |
| with: $Li_2O + Na_2O + K_2O$ | 5.5–8.5. |

4. Glasses in accordance with claim 1 having a refractive index n, of $1.70 \leq n \leq 1.78$.

5. Glasses in accordance with claim 1 having a thermal dilation coefficient, between 25 and 300° C., of $90–110 \times 10^{-7} K^{-1}$, a softening point between about 570° C. and about 620° C., and a liquidus viscosity $\geq 10$ Pa.s.

6. A glass segment for incorporation in a multifocal, ophthalmic lens, wherein the glass segment has a refractive index n of $1.70 \leq n \leq 1.78$, and a composition of oxides, expressed in percentage by weight, in which at least 95% consists essentially of:

| | |
|---|---|
| $SiO_2$ | 29–35 |
| $B_2O_3$ | 0.5–5 |
| $Li_2O$ | 0.5–3 |
| $Na_2O$ | 4–8 |
| $K_2O$ | 0–2 |
| PbO | 28–40 |
| BaO | 4–14 |
| $La_2O_3$ | 4–12 |
| $TiO_2$ | 3–8 |
| ZnO | 0–8 |
| $ZrO_2$ | 0–4 |
| $Nb_2O_5$ | 0–5 |
| with: $Li_2O + Na_2O + K_2O$ | 5.5–9. |

7. A glass segment in accordance with claim 6 having a thermal dilation coefficient, between 25 and 300° C. of $90–110 \times 10^{-7} K^{-1}$, a softening point between about 570° C. and about 620° C., and a liquidus viscosity $\geq 10$ Pa.s.

8. A multifocal corrective lens comprising a principal lens comprising a glass having a low refractive index and at least one segment, soldered to said principal lens, comprising a glass having a higher refractive index, wherein said segment is a glass according to claim 1.

9. The lens according to claim 8, wherein the glass of said principal lens has the following characteristics:

thermal expansion coefficient: $100 \times 10^{-7} K^{-1}$ (between 25 and 300° C.)

softening point: 610° C.

refractive index 1.6.

* * * * *